United States Patent [19]
Abbott, Jr.

[11] Patent Number: 5,197,307
[45] Date of Patent: Mar. 30, 1993

[54] PULL BOX LOCK

[76] Inventor: Merle L. Abbott, Jr., Rte. 1, Box 905-75, Myakka City, Fla. 34202

[21] Appl. No.: 864,512

[22] Filed: Apr. 7, 1992

[51] Int. Cl.[5] .................................... B65D 55/14
[52] U.S. Cl. ...................................... 70/164; 52/221; 70/57; 70/DIG. 34
[58] Field of Search .................... 70/163–165, 70/63, 19, 57, 62, 158, 170, 166, DIG. 34; 174/48, 50; 52/221

[56] References Cited

U.S. PATENT DOCUMENTS

| | | | |
|---|---|---|---|
| 1,692,571 | 11/1928 | Rein | 52/221 |
| 3,710,736 | 1/1973 | Biondi et al. | 109/50 |
| 3,812,279 | 5/1974 | Voegeli | 70/DIG. 34 |
| 4,244,484 | 1/1981 | Guritz et al. | 52/221 |
| 4,248,067 | 2/1981 | Sears | 70/63 |
| 4,591,657 | 5/1986 | Masters | 174/50 |
| 4,819,461 | 4/1989 | Pearson | 70/14 |

Primary Examiner—Renee S. Luebke
Assistant Examiner—D. Boucher
Attorney, Agent, or Firm—Charles J. Prescott

[57] ABSTRACT

A securing device for a cover of a utility wire pull box including an inverted Y-shaped member having diverging legs which are engagable at their lower spaced ends beneath the lower margins of opposing walls of the pull box and at its upper main upright portion through a slot formed through the in-place cover. A lock arrangement such as a padlock may then be secured through a hole in the upright portion which is exposed above the slot in the cover.

4 Claims, 1 Drawing Sheet

PULL BOX LOCK

BACKGROUND OF THE INVENTION

This invention relates generally to locking and securing devices, and more particularly to a device for locking and securing a cover of a utility wire box in place.

Utility wire pull boxes are located throughout a community buried generally flush with the ground and are spaced apart periodically to facilitate pulling electrical and/or telephone wiring through limited lengths of submerged conduit. Each length of electrical wire is then connected to the subsequent length at a joint made within each pull box. Thereafter, a cover is utilized to conceal the contents of each pull box.

The covers may be fabricated of reinforced concrete as within a sidewalk or ground area, or may be fabricated of a downwardly flanged steel plate for installations where the pull box is located in a roadway.

Those desperate for illegal money have resorted to the easy removal of these covers and then the utilization of a vehicle such as a pick-up truck to pull the electrical wiring from the conduit. The copper contained within the electrical wiring is then converted to cash based upon its scrap value. No means is yet known for preventing such unauthorized removal.

The reinstallation of stolen electrical wiring in these conduit is becoming an expensive and disruptive process for utility services and this pilfering and thievery is being accomplished despite the fact that the covers are normally held in place by threaded fasteners or the like.

The present invention provides for a means for securing these covers in place so as to prevent their unauthorized removal and, thereafter easy access to the electrical wiring contained within the conduit between each of these pull boxes.

BRIEF SUMMARY OF THE INVENTION

This invention is directed to a securing device for a cover of a utility wire pull box including an inverted Y-shaped member having legs engagable at their lower spaced ends beneath the lower margins of opposing walls of the pull box and at its upper main upright portion through a slot formed through the in-place cover. A lock arrangement such as a padlock may then be secured through a hole in the upright portion which is exposed above the slot in the cover.

It is therefore an object of this invention to provide a means for securing a cover of a utility pull box in place to prevent unauthorized access into the pull box.

It is yet another object of this invention to provide such a securing means having strength sufficient to resist violent attempts to break into the pull box.

It is yet another object of this invention to provide a securing means for various forms of covers for utility wire pull boxes.

In accordance with these and other objects which will become apparent hereinafter, the instant invention will now be described with reference to the accompanying drawings.

DETAILED DESCRIPTION OF THE INVENTION

Figure 1:
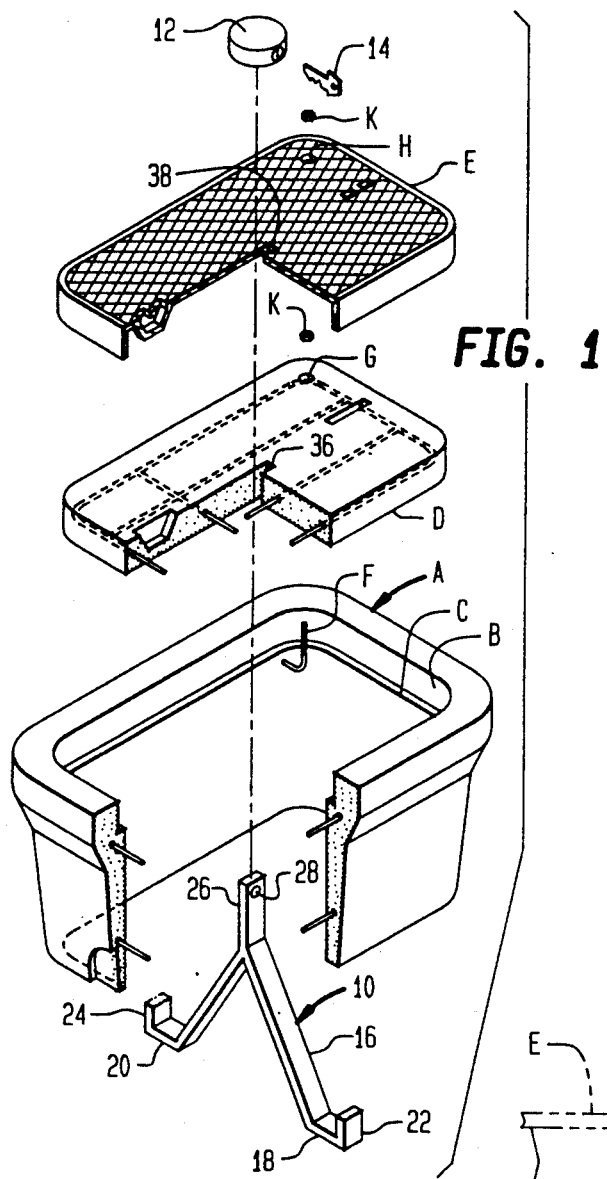
FIG. 1 is an exploded perspective view of the invention positioned with respect to a conventional pull box and with respect to either typical form of a cover available for such pull boxes.

Referring now to the drawings, the invention is shown generally at numeral 10 in connection with a conventional locking member 12 such as a padlock. The invention 10 is fabricated preferably of bar stock steel for strength and is formed having a generally inverted Y-shape. A first length of such bar stock 16 is bent at its mid section into a generally V-shape to form the divergent leg portions, each of which include laterally outwardly extending portions 18 and 20 terminating in upwardly extending flanges 22 and 24. An upright bar stock member 26 is rigidly connected at its lower end as by welding to the mid point of divergent leg portion 16 and having a hole 28 formed therethrough.

Figure 2:
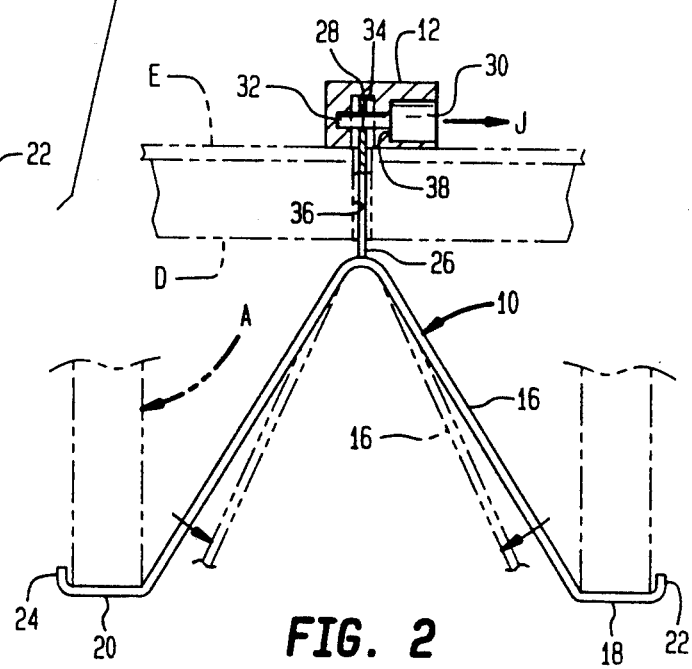
FIG. 2 is a side elevation partially broken view of the invention.

This arrangement 10 is shaped so that outwardly extending portions 18 and 20 are spaced a distance similar to the spacing between the lower margins of opposite upright side walls of a pull box A. Upright flanges 22 and 24 are positioned immediately against the outer surfaces of the pull box side walls as best seen in FIG. 2 to prevent disengagement therefrom.

Hole 28 in upright portion 26 is positioned so as to extend upwardly through a slot 28 or 36 formed within either a steel fabricated cover E or a reinforced concrete cover D, both of which are available for enclosing the contents of a pull box 8. Either of these covers D or E fit within opening B and rest upon flange C.

Under existing circumstance, an upwardly extending threaded fastener F, connected at its lower end into a mating cavity formed into the inner surface of side walls of pull box A, engages into a conventional threaded nut K to secure either cover D or E in place. This conventional securing arrangement is replaced by the present invention. With hole 28 positioned above the exposed surface of either cover D or E, a padlock 12 may be secured therethrough, thus preventing upright member 26 from being withdrawn from slot 36 or 38. The preferred embodiment of padlock 12 is supplied by American Lock Company of Crete, Illinois under their trademark SUPERLOCK, MODEL 2000. This padlock 12 includes a concealed cavity 34 through which locking pin 32 passes transversely and is secured in position within hole 28 by locking cylinder 30. Key 14 is utilized to disengage cylinder 30 for removal in the direction of arrow J in FIG. 2 along with connected shaft 32. Because of its unique structure, the SUPERLOCK padlock prevents destructive removal thereof because of the concealing nature of this device 12 as seen in FIG. 2.

Normally, the pull boxes A are rectangular in nature such that the length thereof is greater than the width. By this arrangement, the device 10 may be installed by orienting the legs 16 longitudinally and passing them to the bottom pull box 18 and then rotating the device 10 ninety degrees for engagement as shown in FIG. 2.

However, the invention may also be formed of steel bar stock of sufficient resiliency so as to allow flexure of legs 16 inwardly as shown in phantom in FIG. 2 so that flanges 22 and 24 fit within the width of upright opposing walls of pull box A and then flex back outwardly after passing below the lower margins of the side walls of the pull box A.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A securing device for a cover of a utility wire pull box open at each end, said securing device comprising:
   an inverted Y-shaped member having outwardly extending portions formed at the distal ends of each leg thereof;
   a main upright portion of said Y-shaped member having a hole therethrough;
   said upright portion passing upwardly through a slot formed centrally through said cover;
   said outwardly extending portions spaced apart horizontally a distance similar to the distance between opposite lower margins of said pull box;
   said hole and said outwardly extending portions spaced apart vertically a distance similar to the height of said pull box wherein a locking means may be secured through said hole with said upright portion extending upwardly through said slot for preventing removal of said cover from said pull box:
   said securing device, when properly installed, requiring removal of said pull box with said securing device to remove said cover.

2. A securing device as set forth in claim 1, wherein:
   said legs are elastically deformable whereby said legs may be manually squeezed together to facilitate installation between opposing walls of said pull box, after which said legs, when released, return to an at rest position wherein said outwardly extending portions engage against said lower margin of said pull box.

3. In an electrical wire pull box having upright side walls defining an opening at each end thereof and a cover positionable on said pull box to enclose the upper end thereof, said pull box open lower end defined by the lower margins of said side walls, the improvement comprising:
   an inverted Y-shaped member having outwardly extending portions formed at the distal ends of each leg thereof;
   a main upright portion of said Y-shaped member having a hole therethrough;
   said upright portion passing upwardly through a slot formed centrally through said cover;
   said outwardly extending portions spaced apart horizontally a distance similar to the distance between opposite lower margins of said pull box;
   said hole and said outwardly extending portions spaced apart vertically a distance similar to the height of said pull box wherein a lock means may be secured through said hole with said upright portion extending upwardly through said slot for preventing removal of said cover from said pull box:
   said securing device, when properly installed, requiring removal of said pull box with said securing device to remove said cover.

4. A securing device as set forth in claim 3, wherein:
   said legs are elastically deformable whereby said legs may be manually squeezed together to facilitate installation between opposing walls of said pull box, after which said legs, when released, return to an at rest position wherein said outwardly extending portions engage against said lower margin of said pull box.

* * * * *